(12) United States Patent
Blaukopf et al.

(10) Patent No.: US 7,730,492 B1
(45) Date of Patent: Jun. 1, 2010

(54) METHOD AND SYSTEM FOR RUNNING MULTIPLE VIRTUAL MACHINES IN A SINGLE PROCESS

(75) Inventors: Daniel Blaukopf, Raanana (IL); Uri Katz, Tel Aviv (IL); Moshe Sayag, Raanana (IL)

(73) Assignee: Oracle America, Inc., Redwood Shores, CA (US)

( * ) Notice: Subject to any disclaimer, the term of this patent is extended or adjusted under 35 U.S.C. 154(b) by 622 days.

(21) Appl. No.: 11/744,044

(22) Filed: May 3, 2007

(51) Int. Cl.
*G06F 13/00* (2006.01)
(52) U.S. Cl. .............................. 719/312; 719/328; 718/1
(58) Field of Classification Search .................. 719/312, 719/328; 718/1
See application file for complete search history.

(56) References Cited

U.S. PATENT DOCUMENTS 7,620,955 B1 * 11/2009 Nelson ........................ 719/312
2003/0135658 A1 * 7/2003 Haggar et al. ................ 709/312

* cited by examiner

*Primary Examiner*—Andy Ho
(74) *Attorney, Agent, or Firm*—Martine Penilla & Gencarella, LLP.

(57) ABSTRACT

A method and system for running a Java ME application on a computer system are described. The Java ME application is a software program designed for execution on a resource-constrained platform. A first virtual machine is launched in a process, the first virtual machine being is caused to run an application emulator. A second virtual machine is launched in the process, the second virtual machine being caused to run the Java ME application. The application emulator interfaces with application programming interfaces of the second virtual machine to interface with inputs and outputs of the Java ME application and redirect the inputs and outputs to local devices controlled by the application emulator.

15 Claims, 3 Drawing Sheets

METHOD AND SYSTEM FOR RUNNING MULTIPLE VIRTUAL MACHINES IN A SINGLE PROCESS

CROSS-REFERENCE TO RELATED ART

This Application is related to U.S. Pat. No. 7,080,387, entitled "System and Method for Mediating Communication Between Software Applications," which issued on Jul. 18, 2006 and is incorporated herein by reference.

BACKGROUND

A virtual machine is a software layer between an application and a platform that isolates the application from the platform on which it is running. A platform comprises computer hardware and the operating system that drives low level operations of the hardware such as memory and thread management. Operating systems are written and compiled to function only with a particular central processing unit (CPU). There are different types of virtual machines. One type of virtual machine allows a multi-platform software application to execute without being written and compiled for the specific platform on which it is running. Another type of virtual machines permits a program designed to operate on one platform to operate on a different platform by modeling the hardware operations in the software domain. In either case, software instructions of the application are converted into native instructions rather then being directly executed natively by the CPU. The conversion of software instructions into native instructions may be performed using an interpreter, a just-in-time (JIT) compiler, or a combination of an interpreter and JIT compiler.

In the realm of resource-constrained platforms, which includes battery operated devices such as wireless phones, pagers, personal digital assistants, camcorders, game devices, MP3 players, small retail payment terminals and smart cards, etc., virtual machines are commonly used to provide cross-platform operability to software applications. One example of such a virtual machine is the Java CVM, which is used to launch and execute Java applications written to the connected device configuration (CDC). A resource-constrained platform having a CVM installed can execute cross-platform Java code to impart desired functionality to the system. For example, a mobile phone having an implementation of CVM can run Java software to implement a game, a calendar, an alarm, or other desired function.

Computer systems implemented in mobile devices or other resource-constrained platforms are generally not well suited for software development. For example, it can be difficult if not impossible to connect a keyboard and full-size monitor to a resource-constrained platform such as a cell phone to write a software application, much less compile the application into byte code suitable for execution on the virtual machine. Because it is not practical to develop and debug software intended for execution on a resource-constrained platform on that same system, it would be desirable to configure a version of the CVM to operate on a desktop computer system. However, in this case, the input and output of the user-interface and other specialized hardware such as networking connectivity must be mapped from the resource-constrained platform to the desktop computer system. Since each resource-constrained platform type (e.g., a particular model of a mobile phone) is provided with a corresponding CVM that is specifically designed with hardware-specific application programming interfaces to operate a specific configuration, it is not practical to reconfigure each CVM with modified APIs that provide user-input and output mapped from the resources available in the resource-constrained platform to the desktop computer system.

U.S. Pat. No. 7,080,387 issued on Jul. 18, 2006 ("the '387 patent") presents a mechanism for placing a Java applications in communication with a native application in a different process. Using this mechanism, a function in the native application can be called from the Java application operating in a virtual machine. Thus, the mechanism described the '387 patent can be used to allow a CVM operating a Java ME applicationJava ME application intended for execution on a resource-constrained platform to function on a desktop computer system by allowing a separate application emulator program to access input and output of the Java ME applicationJava ME application. Once the application emulator has access to the inputs and outputs of the Java ME applicationJava ME application, it can map those inputs and outputs as desired to the actual interface and devices connected to the desktop computer system.

Unfortunately, the local TCP/IP connection implemented by the mechanism described in the '387 patent represents a bottle-neck that restricts data flow between the two virtual machines, thereby reducing performance of the system as a whole. To avoid this performance hit, a new approach is needed to allow connectivity between the application emulator and the CVM.

SUMMARY

Broadly speaking, the present invention fills these needs by providing a method and system for running multiple virtual machines in a single process. It should be appreciated that the present invention can be implemented in numerous ways, including as a process, an apparatus, a system, a device, or a method. Several inventive embodiments of the present invention are described below.

In one embodiment, a method for running a Java ME applicationJava ME application on a computer system is provided. The Java ME applicationJava ME application is a software program designed for execution on a resource-constrained platform. In the method, a first virtual machine is launched in a process, the first virtual machine being caused to run an application emulator. A second virtual machine is launched in the same process as the first virtual machine, the second virtual machine being caused to run the Java ME applicationJava ME application. The application emulator interfaces with application programming interfaces of the second virtual machine to access inputs and outputs of the Java ME applicationJava ME application. The application emulator further redirects the inputs and outputs to local devices controlled by the application emulator.

In another embodiment, a computer readable medium embodying software instructions for running a Java ME applicationJava ME application on a computer system is provided. The Java ME applicationJava ME application is a software program designed for execution on a resource-constrained platform. The computer readable medium includes software instructions for launching a first virtual machine in a process and for causing the first virtual machine to run an application emulator in the first virtual machine. The computer readable medium further includes software instructions for launching a second virtual machine in the same process and for causing the second virtual machine to run the Java ME applicationJava ME application in the second virtual machine. The application emulator interfaces with application programming interfaces (APIs) of the second virtual machine to access inputs and outputs of the Java ME applicationJava ME application and redirects the inputs and outputs to local devices controlled by the application emulator.

In yet another embodiment, a computer system is described. The computer system includes a user interface, a central processing unit (CPU) for executing software instructions, and a memory system. The user interface includes input devices receptive to user interaction and output devices including a graphical display. The memory system includes a computer readable medium for storing and reading software and data. The software includes an operating system for managing the processes executing on the CPU and the memory system, an initialization code that is executed by the operating system and CPU, a Java virtual machine (JVM) that is executed in a process by the initialization code so that the JVM occupies a virtual memory space, and a connected device configuration virtual machine (CVM) that is executed in the process by the initialization code so that the CVM also occupies the virtual memory space. The initialization code causes the CVM to launch a test program, the test program being a computer program written in the Java language for execution on a resource-constrained platform. The initialization code additionally causes the JVM to launch an application emulator, the application emulator being a computer program written in the Java language. The application emulator displays graphical information generated by the test program on the graphical display and passes messages corresponding to user interactions with the input devices to the test program.

The advantages of the present invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION

In the following description, numerous specific details are set forth in order to provide a thorough understanding of the present invention. However, it will be apparent to one skilled in the art that the present invention may be practiced without some of these specific details. In other instances, well known process operations and implementation details have not been described in detail in order to avoid unnecessarily obscuring the invention.

Figure 1:
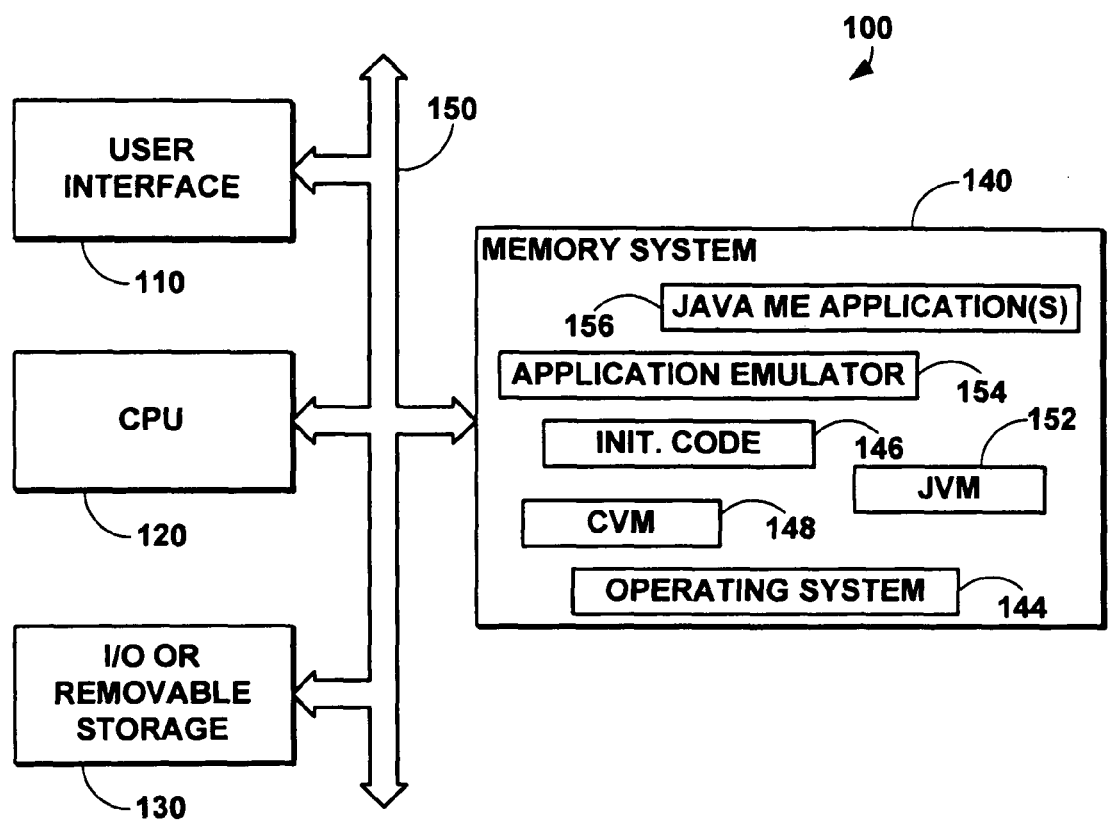
FIG. 1 is a schematic representation of a physical view of a computer system.

FIG. 1 is a schematic representation of a physical view of computer system 100. Computer system 100 includes a bus 150 connecting a user interface 110, a CPU 120, input/output (I/O) and/or removable storage 130, and memory system 140.

User interface 110 may be any user interface suitable for application development. In one embodiment, user interface 110 includes keyboard and mouse inputs, and a video display output. CPU 120 may include one or more processing cores for executing software. I/O and/or removable storage 130 may include removable data storage or communicating devices that allow memory system 140 to receive software and data from sources external to computer system 100.

Memory system 140 may include a plurality of memories for permanent and temporary storage of software applications and data. For example, memory system 140 may include a multi-tiered random-access memory system using virtual address spaces for each process that stores executing software and temporary data in a variety of locations including memory caches, active memory, and hard drive storage. In addition, memory system 140 may include hard non-volatile storage, e.g., using a hard drive storage device. Memory system 140 is therefore includes a computer-readable storage medium.

Memory system 140 can contain a variety of applications and operating system-specific software. In one embodiment, memory system 140 includes one or more Java ME applicationJava ME applications 156, an application emulator 154, initialization code 146, a Java virtual machine (JVM) 152 a connected device configuration (CDC) virtual machine (CVM) 148, and an operation system 144. In one embodiment, the Java ME applicationJava ME applications are written in conformance with the Java ME specification.

Figure 2:
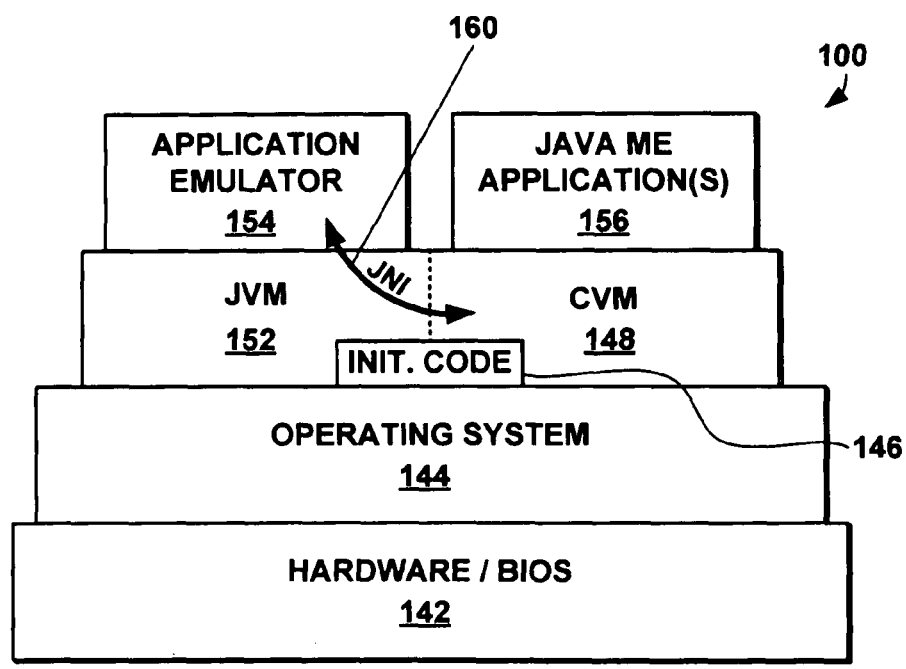
FIG. 2 shows a schematic representation of a logical view of the computer system of FIG. 1.

FIG. 2 shows a schematic representation of a logical view of computer system 100. Computer system 100 includes a hardware/BIOS layer 142 comprising processing and other circuitry as well as the lowest level software responsible for basic functions not handled by operating system 144, e.g., power on self test (POST), bootstrapping, and power and thermal management. Operating system 144 launches application software, manages CPU processes, memory resources, and input/output of the computer system, among other tasks. Any or each of the software components can be loaded from permanent storage, e.g., from a local hard drive, or over a network connection provided by i/o or removable storage 130.

Initialization code 146 is a small program that launches JVM 152 and CVM 148 in a common process as indicated by dotted line 162. Since JVM 152 and CVM 148 execute in a single process, they share a common memory space. That is to say, the CPU and operating system assign a common virtual address space that is occupied and accessed by both JVM 152 and CVM 148. Initialization code 146 causes, e.g., by way of a command-line argument, JVM 152 to launch application emulator 154, which is a Java application that runs in JVM 152. Likewise, initialization code 146 causes CVM 148 to launch one or more Java ME applicationJava ME applications 156, which also may be performed by way of a command-line argument.

Figure 3:
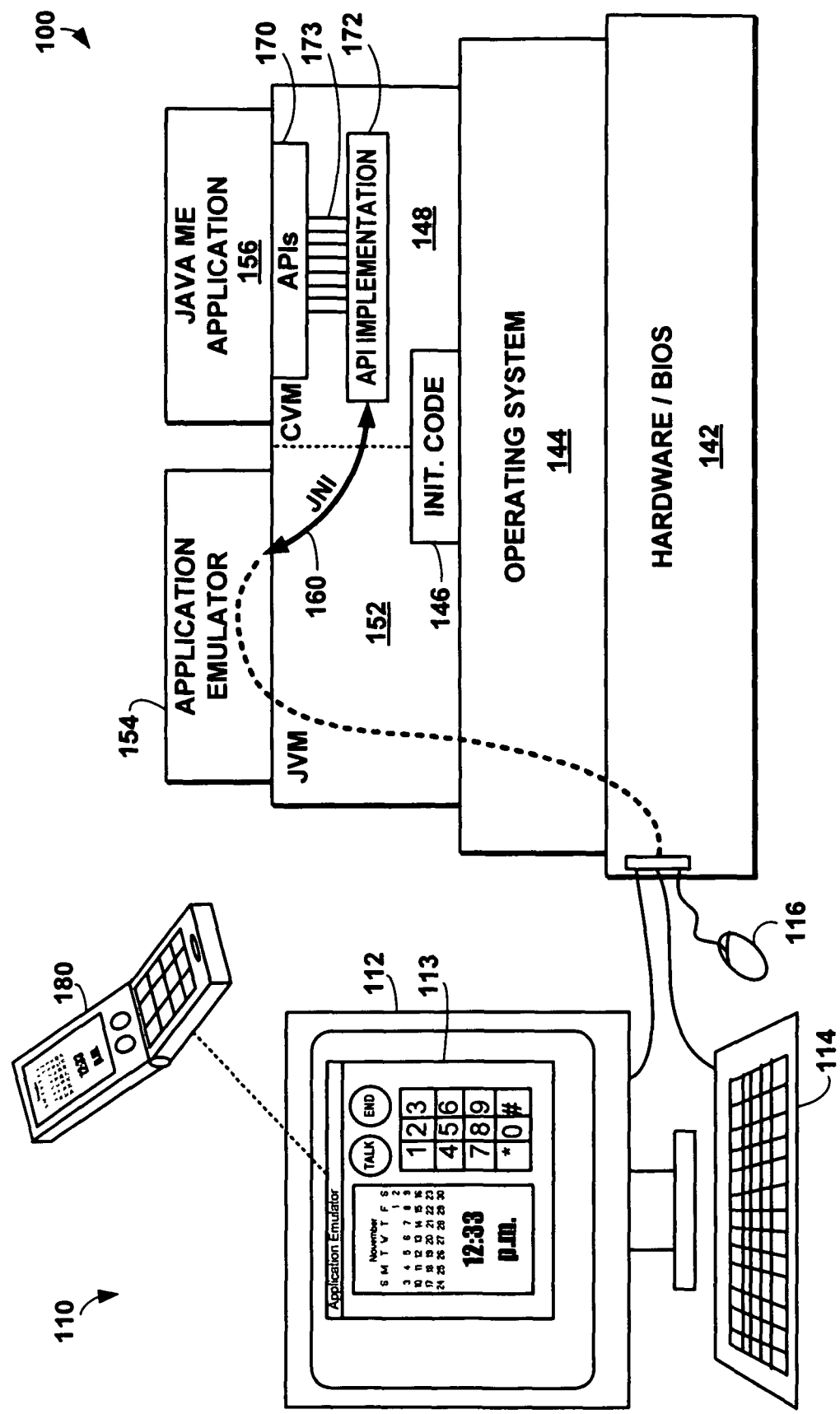
FIG. 3 shows the schematic representation of FIG. 2, with additional details to depict one example of how the computer system may be operated.

FIG. 3 shows additional details of an exemplary operation of computer system 100. Application emulator 154 accesses APIs 172 of CVM which, through the API implementation 172. receive and generate inputs and outputs 173 of Java ME application(s) 156. Application emulator 154 can then pass these inputs and outputs to user interface 110 using APIs (not shown) of JVM 152 which in turn interface with operating system 144 and hardware/BIOS layer 142. In one embodiment, application emulator 154 provides a graphical representation 113 of an input device, e.g., a touch-screen or a keypad and a display of a physical resource-constrained platform 180. User interaction with the graphical representation 113, e.g., by the use of a mouse 116 or keyboard 114, is converted by application emulator 154 to messages which are sent by way of the Java Native Interface (JNI) 160 to API implementation 172 in CVM 148. The API implementation then passes those messages through the APIs 170 to Java ME application(s) 156 which interpret the messages as user input. Likewise, output generated by Java ME application(s) 156, such as a graphical image, is passed in the form of an output message to APIs 149 in CVM 148. APIs 170 can be polled by application emulator 154 to receive the output, e.g., the graphical image. Application emulator 154 can then map that graphical image to a at least a portion of the display screen 112 viewable by the user, allowing the user to view what is being displayed by Java ME application 156. Other outputs, such as audio or networking outputs can be captured and conveyed to the user using a similar technique. In this way, the application emulator is able to access inputs and outputs of the Java ME application(s) and redirect the inputs and outputs thereof to local devices controlled by the application emulator.

Currently available versions of JVM and CVM are not designed to operate in a common memory space. Specifically, the JVM and CVM have conflicting names for some JNI types and methods, and which are not compatible. Therefore, a JNI object created in one virtual machine could not be accessed from the other virtual machine due to the conflicting types. For example, JVM has a type called a "JNIEnv." A CVM object of type JNIEnv could be created, however if it were accessed from the Java application, the Java application would receive data from the object in an unrecognized format and the system could crash.

Figure 4:
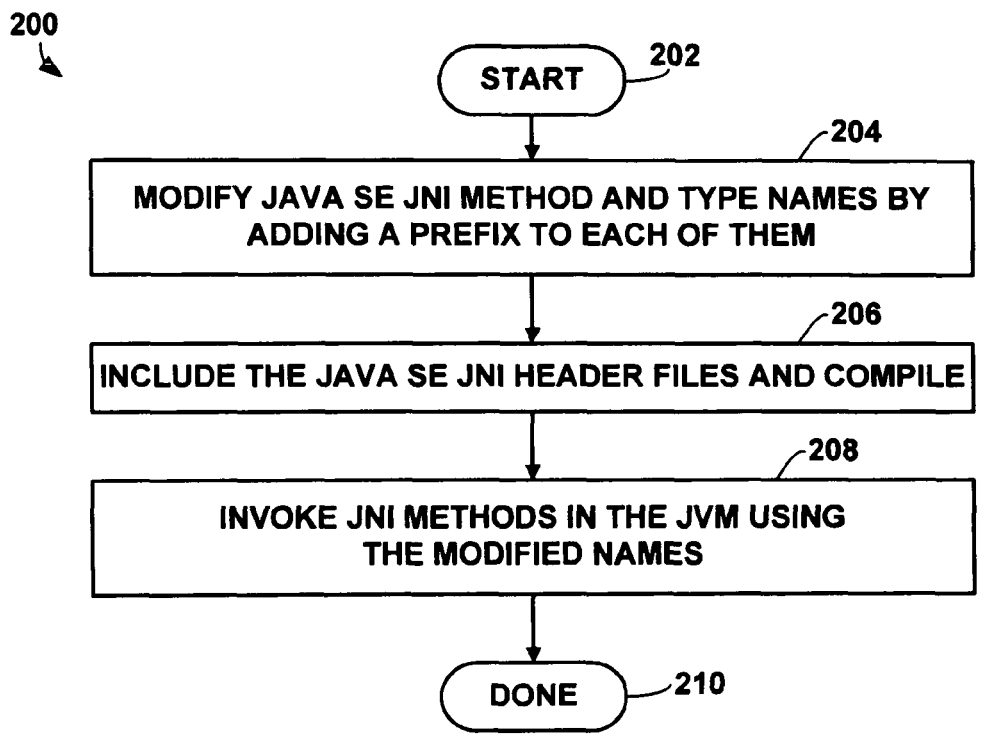
FIG. 4 shows a flowchart depicting by way of example a procedure for modifying a JVM so that it can coexist with a CVM.

FIG. 4 shows a flowchart 200 depicting by way of example a procedure for modifying JVM 152 so that it can coexist with CVM 148 in a single process and memory space. The procedure begins as indicated in operation 202 and flows to operation 204 wherein the Java SE JNI method and type names of the JVM are modified by adding a prefix to each of them. In operation 206, the modified JNI header files are included into the Java SE, which is then compiled. The including and compiling can be performed concurrently. Then in operation 208, the JNI methods in the JVM can be invoked using the modified names, i.e., with the prefix. The method is then completed as indicated by done block 210. It should be noted that, instead of a prefix, a different modification can be used. By modifying the method and type names, ambiguity between the JNI methods and types of the CVM and JVM are resolved.

Figure 5:
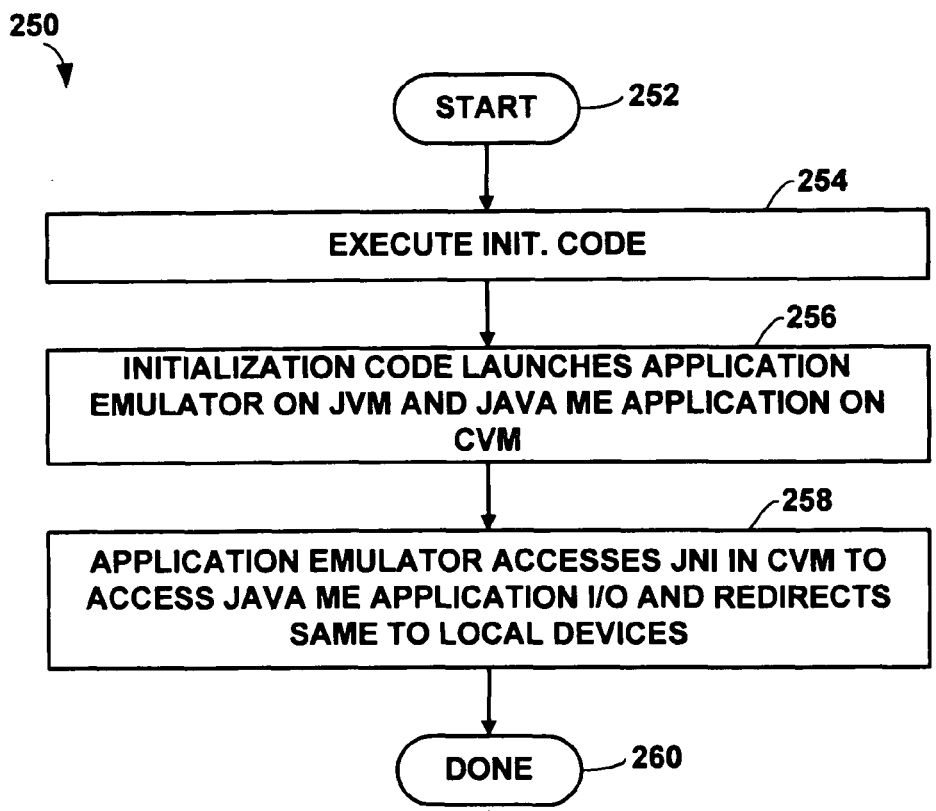
FIG. 5 shows a flowchart depicting by way of example a procedure for accessing input and output of a test program running on a CVM.

FIG. 5 shows a flowchart 250 depicting by way of example a procedure for accessing inputs and outputs of a test program running on a CVM. The method begins as indicated at start block 252 and proceeds to operation 254 wherein an initialization code is executed. In operation 256, the initialization code launches the application emulator on a JVM and the Java ME application on the CVM. The CVM and the JVM are launched in a common process so that they use a shared memory space. Then, in operation 258, the application emulator is able to access inputs and outputs of the Java ME application and redirect them to local devices, allowing the user to interact with the Java ME application. The application emulator accesses the inputs and outputs by invoking methods in the CVM's API routines using the JNI mechanism which is part of Java. The procedure ends as indicated by done block 260.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated. Further, the manipulations performed are often referred to in terms such as producing, identifying, determining, or comparing.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion. In addition, the invention may be encoded in an electromagnetic carrier wave in which the computer code is embodied.

Embodiments of the present invention can be processed on a single computer, or using multiple computers or computer components which are interconnected. A computer, as used herein, shall include a standalone computer system having its own processor(s), its own memory, and its own storage, or a distributed computing system, which provides computer resources to a networked terminal. In some distributed computing systems, users of a computer system may actually be accessing component parts that are shared among a number of users. The users can therefore access a virtual computer over a network, which will appear to the user as a single computer customized and dedicated for a single user.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for running a Java ME application on a computer system, the Java ME application being a software program designed for execution on a resource-constrained platform, the method comprising:

launching a first virtual machine in a process and causing the first virtual machine to run an application emulator in the first virtual machine;

launching a second virtual machine in the process and causing the second virtual machine to run the Java ME application in the second virtual machine; and wherein the application emulator interfaces with application programming interfaces (APIs) of the second virtual machine to access inputs and outputs of the Java ME application, the application emulator redirecting the inputs and outputs to local devices controlled by the application emulator.

2. The method of claim 1, wherein the inputs include messages corresponding to user interaction of the resource-constrained platform, the messages being generated by user interaction with the local devices controlled by the application emulator, the application emulator mapping the user interaction with the local devices to the user interactions of the resource-constrained platform and passing messages to the APIs.

3. The method of claim 1, wherein the outputs include messages corresponding to a graphical display on the resource-constrained platform, the messages being generated by the Java ME application, the application emulator receiving these messages by way of the interfaces with the APIs and mapping the graphical display to a local display controlled by the application emulator.

4. The method of claim 1, wherein:
the first virtual machine is a Java virtual machine (JVM) and the second virtual machine is a connected device configuration (CDC) Java virtual machine (CVM) and
the application emulator interfaces with the APIs using a Java Native Interface (JNI).

5. The method of claim 1, wherein the first virtual machine is a Java virtual machine (JVM) having a Java Native Interface (JNI), the JVM having been modified by adding a prefix to method and type names of JNI header files, the application emulator being written to call JNI methods using the modified names.

6. The method of claim 1, wherein the first virtual machine is a Java virtual machine (JVM) and the second virtual machine is a connected device configuration (CDC) Java virtual machine (CVM).

7. A computer readable medium embodying software instructions for running a Java ME application on a computer system, the Java ME application being a software program designed for execution on a resource-constrained platform, the computer readable medium comprising:
software instructions for launching a first virtual machine in a process and for causing the first virtual machine to run an application emulator in the first virtual machine;
software instructions for launching a second virtual machine in the process and for causing the second virtual machine to run the Java ME application in the second virtual machine; and
wherein the application emulator interfaces with application programming interfaces (APIs) of the second virtual machine to access inputs and outputs of the Java ME application, the application emulator redirecting the inputs and outputs to local devices controlled by the application emulator.

8. The computer readable medium of claim 7, wherein:
the inputs include messages corresponding to user interaction of the resource-constrained platform, the messages being generated by user interaction with the local devices controlled by the application emulator; and
the application emulator maps the user interaction with the local devices to the user interactions of the resource-constrained platform and passes the messages to the APIs.

9. The computer readable medium of claim 7, wherein:
the outputs include messages corresponding to a graphical display on the resource-constrained platform, the messages being generated by the Java ME application; and
the application emulator receives the messages by way of the interfaces with the APIs and maps the graphical display to a local display controlled by the application emulator.

10. The computer readable medium of claim 7, wherein:
the first virtual machine is a Java virtual machine (JVM) and the second virtual machine is a connected device configuration (CDC) Java virtual machine (CVM) and
the application emulator interfaces with the APIs using a Java Native Interface (JNI).

11. The computer readable medium of claim 7, wherein the first virtual machine is a Java virtual machine (JVM) having a Java Native Interface (JNI), the JVM having been modified by adding a prefix to method and type names of JNI header files, the application emulator being written to call JNI methods using the modified names.

12. The method of claim 7, wherein the first virtual machine is a Java virtual machine (JVM) and the second virtual machine is a connected device configuration (CDC) Java virtual machine (CVM).

13. A computer system comprising:
a user interface, the user interface including input devices receptive to user interaction and output devices including a graphical display;
a central processing unit (CPU) for executing software instructions, and
a memory system, the memory system including computer readable medium for storing and reading software and data, the software including:
an operating system for managing the processes executing on the CPU and the memory system;
an initialization code that is executed by the operating system and CPU;
a Java virtual machine (JVM) that is executed in a process by the initialization code so that the JVM occupies a virtual memory space; and
a connected device configuration virtual machine (CVM) that is executed in the process by the initialization code so that the CVM also occupies the virtual memory space; wherein
the initialization code causes the CVM to launch a test program, the test program being a computer program written in the Java language for execution on a resource-constrained platform;
the initialization code causes the JVM to launch an application emulator, the application emulator being a computer program written in the Java language; and
the application emulator displays graphical information on the graphical display generated by the test program and passes messages corresponding to user interactions with the input devices to the test program.

14. The computer system of claim 13, wherein the application emulator interfaces with application programming interfaces (APIs) of the CVM to send the messages corresponding to the user interaction and receive the graphical information, the application emulator interfacing with the APIs by way of a Java Native Interface (JNI).

15. The computer system of claim 13, wherein:
the JVM has a Java Native Interface (JNI), the JVM having been modified by adding a prefix to method and type names of JNI header files, the application emulator being written to call JNI methods using the modified names.

* * * * *